(12) United States Patent
Kishimoto

(10) Patent No.: US 9,007,677 B2
(45) Date of Patent: Apr. 14, 2015

(54) WAVELENGTH CONVERSION ELEMENT AND MANUFACTURING METHOD THEREOF

(71) Applicant: Oki Electric Industry Co., Ltd., Tokyo (JP)

(72) Inventor: Tadashi Kishimoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 14 days.

(21) Appl. No.: 13/944,937

(22) Filed: Jul. 18, 2013

(65) Prior Publication Data

US 2014/0085710 A1    Mar. 27, 2014

(30) Foreign Application Priority Data

Sep. 24, 2012   (JP) ................. 2012-209925

(51) Int. Cl.
G02F 1/35       (2006.01)
B32B 37/14      (2006.01)
G02F 1/355      (2006.01)

(52) U.S. Cl.
CPC .............. *G02F 1/35* (2013.01); *G02F 1/3558* (2013.01); *G02F 2001/3548* (2013.01)

(58) Field of Classification Search
USPC .......................................... 156/257, 268, 330
See application file for complete search history.

(56) References Cited

U.S. PATENT DOCUMENTS

| | | | | |
|---|---|---|---|---|
| 2006/0109542 A1* | 5/2006 | Mizuuchi et al. | | 359/330 |
| 2009/0009854 A1* | 1/2009 | Yoshino | | 359/332 |
| 2010/0226002 A1* | 9/2010 | Yoshino | | 359/328 |
| 2011/0194171 A1* | 8/2011 | Akino et al. | | 359/326 |
| 2012/0134012 A1* | 5/2012 | Guerin et al. | | 359/328 |
| 2014/0177035 A1* | 6/2014 | Tani et al. | | 359/328 |

FOREIGN PATENT DOCUMENTS

| | | |
|---|---|---|
| JP | 10-083001 H | 3/1998 |
| JP | 11-174390 H | 7/1999 |
| JP | 2005-077470 A | 3/2005 |

OTHER PUBLICATIONS

M. Iwai et al., "High-Power blue generation from a periodically poled MgO:LiNbO$_3$ ridge-type waveguide by frequency doubling of a diode end-pumped Nd:Y$_3$Al$_5$O$_{12}$ laser" Applied Physics Letters, vol. 83, No. 18. pp. 3659-3661, Nov. 3, 2003.

* cited by examiner

*Primary Examiner* — Hemang Sanghavi
(74) *Attorney, Agent, or Firm* — Rabin & Berdo, P.C.

(57) ABSTRACT

A wavelength conversion element includes a core formed of a ferroelectric crystal having a periodically poled structure in which first and second domains having mutually inverted directions of spontaneous polarization are alternately aligned side by side, and a cladding covering all side surfaces of the core along a light propagation direction and having a uniform refractive index. Boundary surfaces of the first and second domains are arranged in a non-parallel manner with respect to the light propagation direction.

1 Claim, 4 Drawing Sheets

WAVELENGTH CONVERSION ELEMENT AND MANUFACTURING METHOD THEREOF

CROSS REFERENCE TO RELATED APPLICATION(S)

This application is based upon and claims benefit of priority from Japanese Patent Application No. 2012-209925, filed on Sep. 24, 2012, the entire contents of which are incorporated herein by reference.

BACKGROUND

The present invention relates to a wavelength conversion element and a manufacturing method thereof.

A quasi-phase matching (QPM) type wavelength conversion element (hereinafter also simply referred to as a "wavelength conversion element") is attracting attention, which performs wavelength conversion by realizing quasi-phase matching using a periodically poled structure. The wavelength conversion element has an optical waveguide formed of a periodically poled structure (hereinafter also simply referred to as a "polarization inversion structure), which has a period that accords with a wavelength of fundamental light on which wavelength conversion is to be performed. The fundamental light is input into the optical waveguide and wavelength converted light, on which the wavelength conversion has been performed, is output.

The wavelength conversion element is mainly used in the field of optical communication, but is also starting to be used in the field of optical measurement, such as in electrooptic deflectors (refer to Japanese Patent Application Publication No. JP-A-10-83001, for example), in terahertz wave generation devices (refer to Japanese Patent Application Publication No. JP-A-2005-77470, for example) and in optical modulators (refer to Japanese Patent Application Publication No. JP-A-11-174390, for example).

In any application, a highly efficient wavelength conversion performance is required of the wavelength conversion element. For that reason, it is effective to increase an overlap of electric field distributions of the fundamental light and the wavelength converted light. However, due to asymmetry of a refractive index profile of the optical waveguide, it has been difficult to improve wavelength conversion efficiency of the wavelength conversion element. Hereinafter, this point will be explained in more detail.

For example, the optical waveguide of the wavelength conversion element is obtained by forming, using a known proton exchange method or a Ti diffusion method, a high refractive index region on a ferroelectric crystal substrate that has a polarization inversion structure formed in accordance with a known method. In the optical waveguide (hereinafter also referred to as a "diffusion type optical waveguide") formed in this manner, as protons or titanium are diffused from a substrate surface, dependent on a density of these materials, the refractive index gradually diminishes as the depth increases. In the optical waveguide having this type of refractive index profile, as the fundamental light and the wavelength converted light have significantly different electric field distributions, it has not been possible to increase wavelength conversion efficiency.

Further, as another method to form the optical waveguide, a technology exists in which a ferroelectric crystal substrate, which is bonded onto a low refractive index substrate that is a base and which has a polarization inversion structure, is diced in straight lines such that it has a ridge shape in cross section (refer to M. Iwai et al., "High-power blue generation from a periodically poled MgO: LiNbO3 ridge-type waveguide by frequency doubling of a diode end-pumped Nd: Y3Al5O12 laser", Applied Physics Letters, Vol. 83, No. 18, p. 3659-3661, 3 Nov. 2003, for example).

SUMMARY

Certainly, compared to the diffusion-type optical waveguide, the symmetry of the refractive index inside the optical waveguide is higher in the ridge-type optical waveguide and thus the wavelength conversion efficiency can be increased more than in the optical waveguide obtained by the proton exchange method etc. However, the outside of the ridge-type optical waveguide is air, and therefore the refractive index profile of the optical waveguide in a direction that is perpendicular to the substrate surface becomes asymmetrical. Due to this asymmetry, displacement occurs between the electric field distributions of the fundamental light and of the wavelength converted light, and the wavelength conversion efficiency cannot be sufficiently improved.

The present invention has been developed against the above-described technological background. It is thus desirable to obtain a wavelength conversion element having a higher wavelength conversion efficiency than in related art and a manufacturing method thereof.

As a result of dedicated consideration by the inventor, the idea was conceived that wavelength conversion efficiency can be increased by using a wavelength conversion element in which a core having a polarization inversion structure is embedded in an isotropic cladding, namely in a cladding in which the refractive index is uniform, irrespective of location. In other words, a wavelength conversion element according to an embodiment of the present invention includes a core and a cladding. Here, the core is formed of a ferroelectric crystal that has a periodically poled structure in which first and second domains having mutually inverted directions of spontaneous polarization are alternately aligned side by side. Further, the cladding covers all the side surfaces of the core along a light propagation direction and has a uniform refractive index. Then, boundary surfaces of the first and second domains are arranged such that the boundary surfaces are not parallel to the light propagation direction.

Further, in a manufacturing method of a wavelength conversion element according to an embodiment of the present invention, a ferroelectric crystal substrate is prepared that has a periodically poled structure in which first and second domains having mutually inverted directions of spontaneous polarization are alternately aligned side by side. Then, the ferroelectric crystal substrate and a first base plate are bonded together by an adhesive having a thickness of 2 μm or more that is filled between mutually facing principal surfaces of the ferroelectric crystal substrate and the first base plate.

Next, by forming two grooves, from the side of the ferroelectric crystal substrate, that follow a direction that is not in parallel to boundary surfaces of the first and second domains, an element precursor is formed, having as its core the area of the ferroelectric crystal substrate between the two grooves. Here, it is assumed that a depth of the grooves measured perpendicularly to the principal surface of the ferroelectric crystal substrate is equal to or greater than a thickness of the ferroelectric crystal substrate, and also that a width of the grooves that is orthogonal to the light propagation direction and that is parallel to the principal surface of the ferroelectric crystal substrate is equal to or more than 2 μm.

Next, by filling the adhesive between a surface of the element precursor on which the core is formed and a principal surface of a second base plate, the element precursor and the second base plate are bonded together. At the same time that the inside of the two grooves is filled with the adhesive, the adhesive having a thickness of 2 μm or more is interposed between a top surface of the core and the principal surface of the second base plate. In this manner, the adhesive is caused to function as a cladding.

According to the wavelength conversion element configured as described above, and to the manufacturing method thereof, it is possible to increase symmetry of a refractive index around a core, and it is thus possible to increase an overlap of electric field distributions of fundamental light and wavelength converted light. As a result, it is possible to improve wavelength conversion efficiency from fundamental light to wavelength converted light in comparison to related art.

DETAILED DESCRIPTION OF THE EMBODIMENT(S)

Figure 1A:
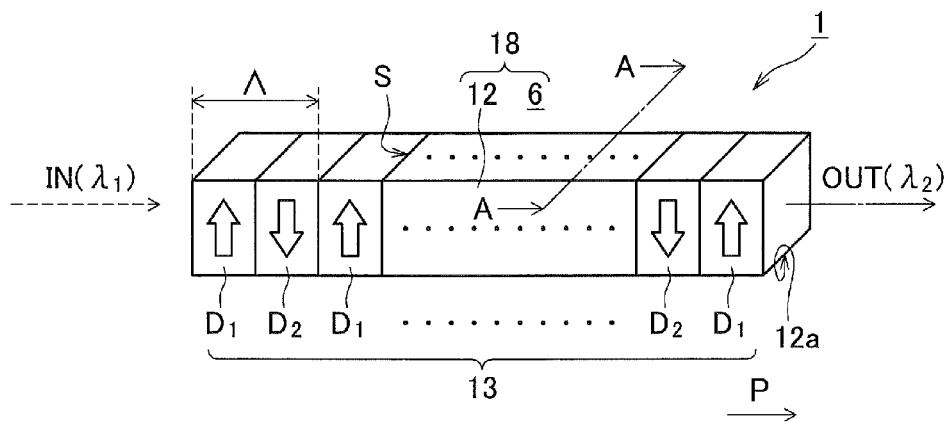
FIG. 1A is a schematic diagram schematically illustrating a wavelength conversion element, FIG. 1B corresponds to a known wavelength conversion element, and FIG. 1C corresponds to a wavelength conversion element according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Note that, in the drawings, a shape, size and layout relationship of each of the structural elements is illustrated schematically to an extent that the embodiment of the present invention can be understood. Additionally, preferred structural examples of the present invention are explained hereinafter, but with respect to conditions relating to a material or quantity of each of the structural elements etc., these are simply preferred examples. Thus, the present invention is not limited to the following described embodiment. Further, in each of the drawings, common structural elements are denoted by the same reference numerals, and a repeated explanation thereof may be omitted. In addition, in cases in which a corresponding relationship with another drawing is clear, a reference numeral of a structural element may be omitted.

Outline of Present Invention

Figure 1B:
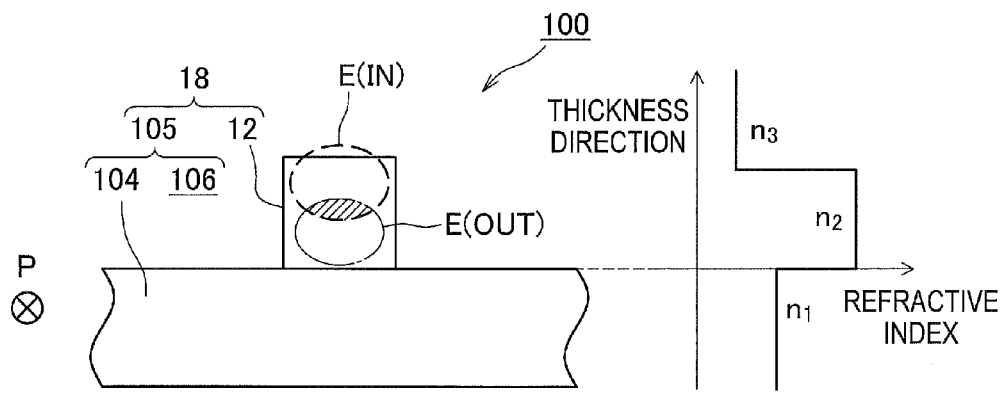
Figure 1C:
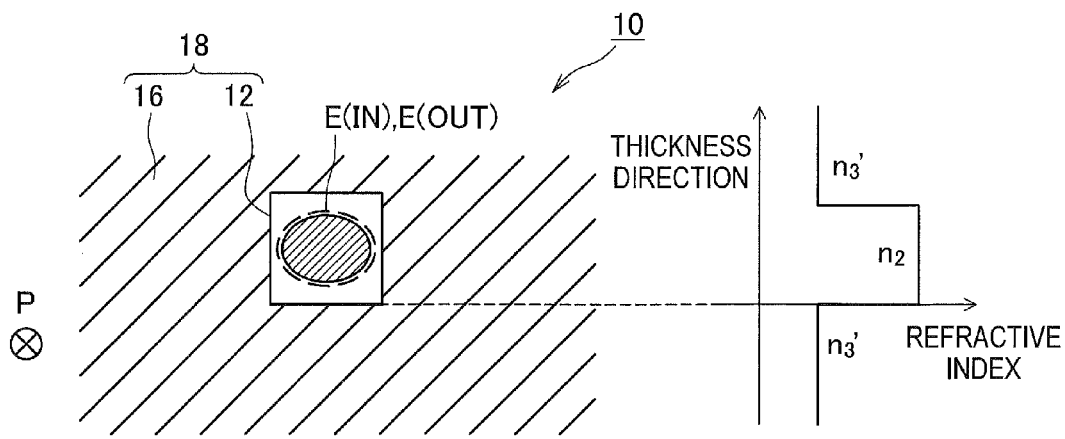

First, an outline of the present invention will be explained with reference to FIG. 1A to FIG. 1C. FIG. 1A is a schematic diagram illustrating an outline of a wavelength conversion element. FIG. 1B corresponds to a known wavelength conversion element. FIG. 1C corresponds to a wavelength conversion element according to an embodiment of the present invention. FIG. 1B and FIG. 1C each correspond to an end view along a line A-A in FIG. 1A. Further, as well as the end view, FIG. 1B and FIG. 1C also show a refractive index profile of the element measured along the thickness direction.

Before explaining a wavelength conversion element 1, directions and dimensions that will be used in the following explanation will be defined with reference to FIG. 1A. A direction that is perpendicular to a light propagation direction (shown by an arrow P in the drawings) of fundamental light IN and that is also parallel to a bottom surface 12a of a core 12 is referred to as a width direction. A geometrical length that is measured along the width direction is referred to as a "width." Further, a direction that is perpendicular to the bottom surface 12a is referred to as a height/thickness direction, and a geometrical length that is measured along the height/thickness direction is referred to as a "height" or a "thickness." Similarly, a geometrical length that is measured along the light propagation direction is referred to as a "length." Furthermore, a section that is perpendicular to the light propagation direction of a specific structural body is referred to as a "cross section."

To start, the wavelength conversion element 1 will be explained with reference to FIG. 1A. The wavelength conversion element 1 includes an optical waveguide 18 that is formed of the core 12, and a cladding 6 that is provided around the core 12. The core 12 is formed of a ferroelectric crystal that has a periodically poled structure 13 in which first domains $D_1$ and second domains $D_2$ having mutually inverted directions of spontaneous polarization (as shown by white arrows in FIG. 1A) are alternately aligned side by side.

Here, a period Λ of the first and second domains $D_1$ and $D_2$ of the polarization inversion structure 13 is set such that quasi-phase matching conditions (hereinafter also referred to as QPM conditions) are satisfied with respect to the fundamental light IN of a wavelength $\lambda_1$. Further, boundary surfaces S of the first and second domains $D_1$ and $D_2$ are arranged such that they are not parallel to the light propagation direction. In this example, the boundary surfaces S are provided perpendicularly to the light propagation direction.

As a result of the above, the fundamental light IN ($\lambda_1$) that is input to one end of the core 12 of the optical waveguide 18 is wavelength converted in the course of propagating through the core 12, and a wavelength $\lambda_2$ ($\neq \lambda_2$) is output as wavelength converted light OUT.

Hereinafter, the QPM conditions will be described in detail. For example, in order to convert the wavelength of the input fundamental light IN based on second harmonic generation, it is sufficient that the period Λ of the polarization inversion structure 13 is a value that satisfies the following Formula (1).

$$\Lambda = \lambda_1 / \{2(N_2 - N_1)\} \quad \text{Formula (1)}$$

Here, $N_1$ is an equivalent refractive index of the optical waveguide 18 with respect to the fundamental light IN, and $N_2$ is an equivalent refractive index of the optical waveguide 18 with respect to the wavelength converted light OUT. The equivalent refractive index of the optical waveguide 18 with respect to the fundamental light IN or the wavelength converted light OUT is a numerical value that is expressed by normalizing a relationship between a frequency and a propagation coefficient of the fundamental light IN or the wavelength converted light OUT propagating through the optical waveguide 18. A phase velocity of the fundamental light IN or of the wavelength converted light OUT propagating through the optical waveguide 18 is the same as a case in which the fundamental light IN or the wavelength converted light OUT propagate through an empty space having this equivalent refractive index.

In addition, for wavelength conversion elements based on difference frequency generation or sum frequency generation etc., similarly, by setting the period Λ such that the QPM conditions are satisfied, each of the systems of wavelength conversion can be realized.

In this example, the case is explained in which the boundary surfaces S are arranged perpendicularly to the light propagation direction. However, an extending direction of the boundary surfaces S may be a non-parallel direction with respect to the light propagation direction other than perpendicular to the light propagation direction. Namely, the extending direction of the boundary surfaces S may be diagonal with respect to the light propagation direction. Even with this structure, it is possible to perform wavelength conversion based on a wavelength corresponding to an effective period Λ' of the polarization inversion structure 13. Here, the effective period Λ' is obtained by Λ'=Λ/sin Θ when an angle between the boundary surfaces S and the light propagation direction is Θ.

Next, a known wavelength conversion element 100 (hereinafter also referred to as a known element 100) will be explained with reference to FIG. 1B. The known element 100 includes a ridge-type core 12 that has a rectangular shape in cross section and that is formed as the polarization inversion structure 13, and a cladding 105. In the known element 100, the core 12 and the cladding 105 form the optical waveguide 18. Here, the cladding 105 is formed of a base plate 104 that is in contact with the bottom surface of the core 12, and a first cladding 106 that is in contact with both side surfaces and the top surface of the core 12.

When referring to a refractive index profile shown in FIG. 1B, in the known element 100, the refractive index profile is asymmetric along the thickness direction, due to the fact that the core 12 is provided on the base plate 104. Namely, when the respective refractive indices of the core 12, the base plate 104 and the first cladding 106 are $n_2$, $n_1$ and $n_3$, a relationship of magnitude $n_2 > n_1 > n_3$ is obtained.

As a result of the asymmetry of the refractive index profile around the core 12, in a cross section of the core 12, displacement occurs between an electric field distribution E (IN) of the fundamental light IN and an electric field distribution E (OUT) of the wavelength converted light OUT in the thickness direction, as shown in FIG. 1B. The conversion efficiency from the fundamental light IN to the wavelength converted light OUT is dependent on the overlap (an area indicated by diagonal lines in FIG. 1B) of the two electric field distributions E (IN) and E (OUT). As described above, in the known element 100 that has the asymmetrical refractive index profile, it is not possible to avoid displacement between the two electric field distributions E (IN) and E (OUT), and thus it is not possible to sufficiently improve the wavelength conversion efficiency.

In contrast, in a wavelength conversion element 10 according to the embodiment of the present invention shown in FIG. 1C, all the side surfaces of the core 12 along the light propagation direction are covered by a cladding 16 having a uniform refractive index. In particular, in the example shown in FIG. 1C, the core 12 is embedded in the cladding 16 having a uniform refractive index $n_3'$ ($<n_2$) and the core 12 and the cladding 16 form the optical waveguide 18.

In this manner, as shown by the refractive index profile in FIG. 1C, the refractive index profile in the thickness direction is symmetrical with respect to the core 12. As a result, the displacement between the electric field distribution (IN) of the fundamental light and the electric field distribution E (OUT) of the wavelength converted light does not occur, and the overlap of the two electric field distributions is maximized. As a result of, the wavelength conversion efficiency of the wavelength conversion element 10 according to the embodiment of the present invention is improved in comparison to the known element 100.

Embodiment

Figure 2A:
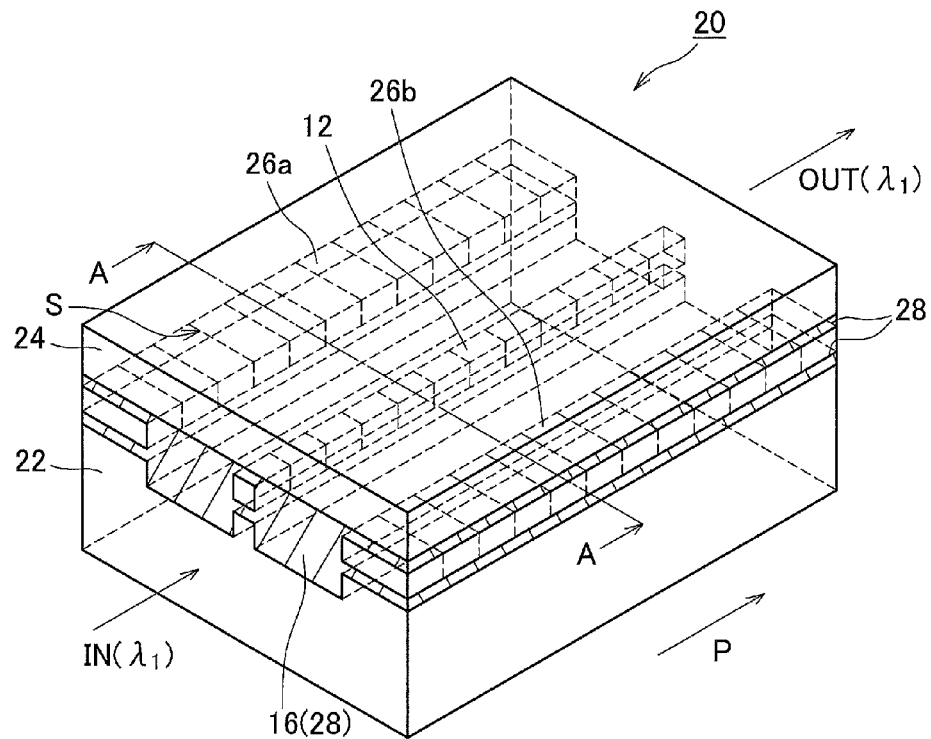
FIG. 2A is a perspective view schematically showing a configuration of the wavelength conversion element.
Figure 2B:
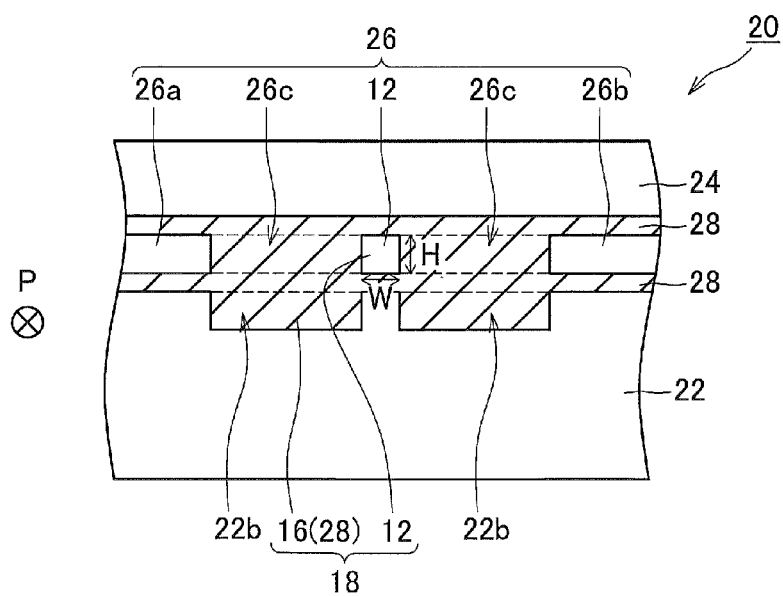
FIG. 2B is an end view along a line A-A shown in FIG. 2A.
Figure 3A:
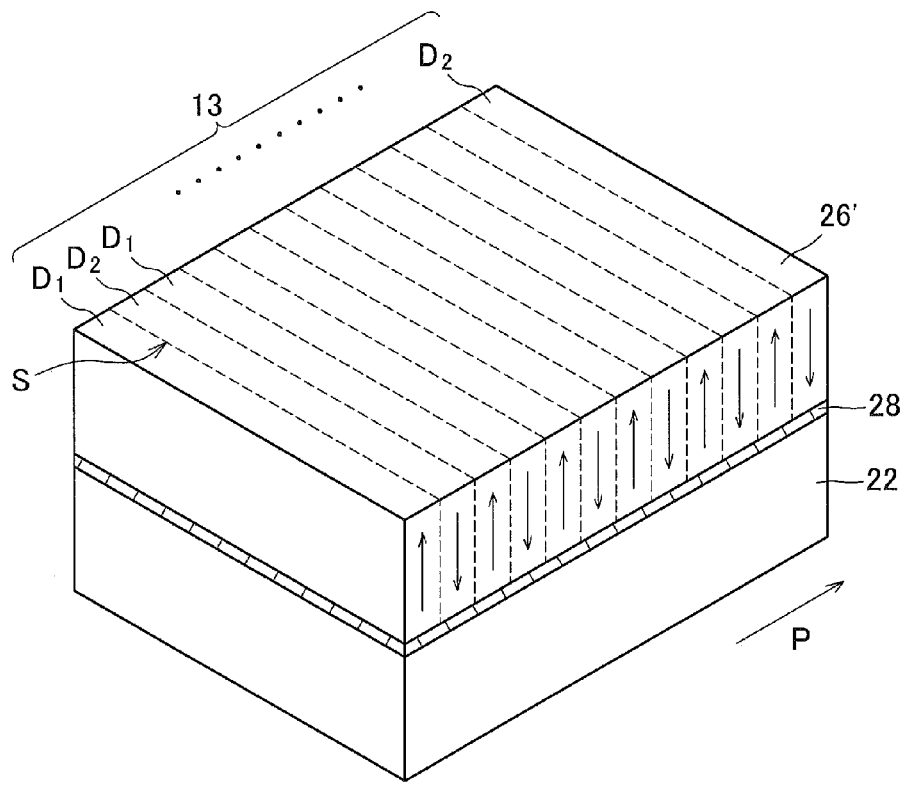
FIG. 3A and FIG. 3B are perspective views showing, in a process order, a manufacturing method of the wavelength conversion element.
Figure 3B:
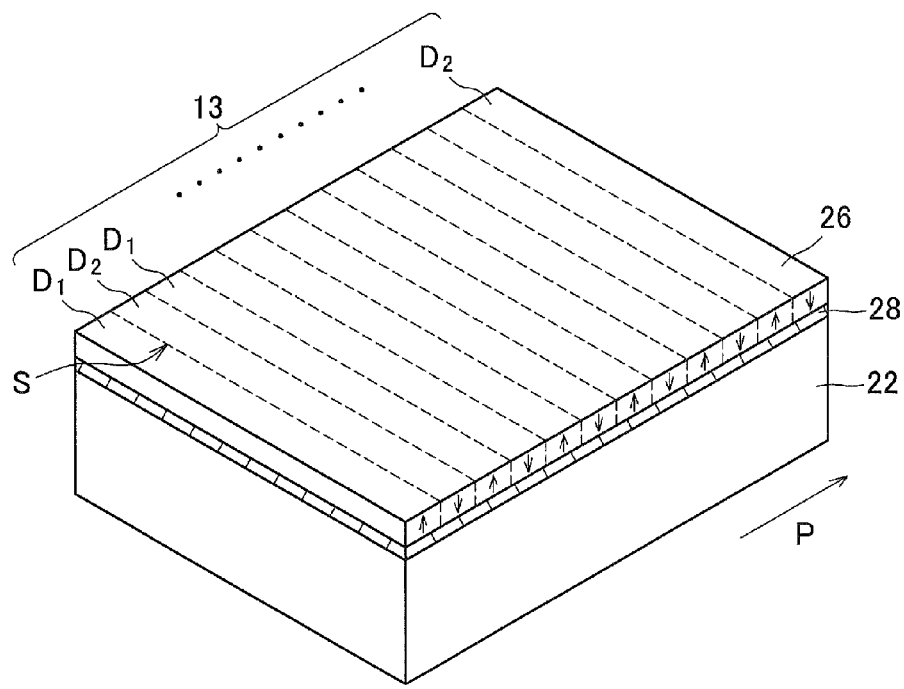
Figure 4A:
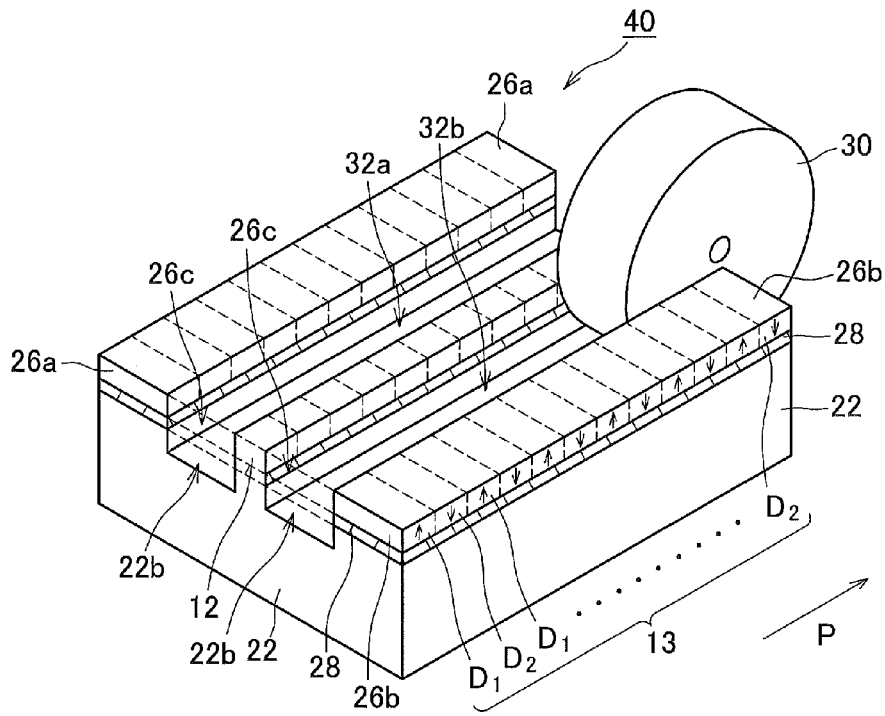
FIG. 4A and FIG. 4B are perspective views showing, in a process order, processes that follow the process shown in FIG. 3B.
Figure 4B:
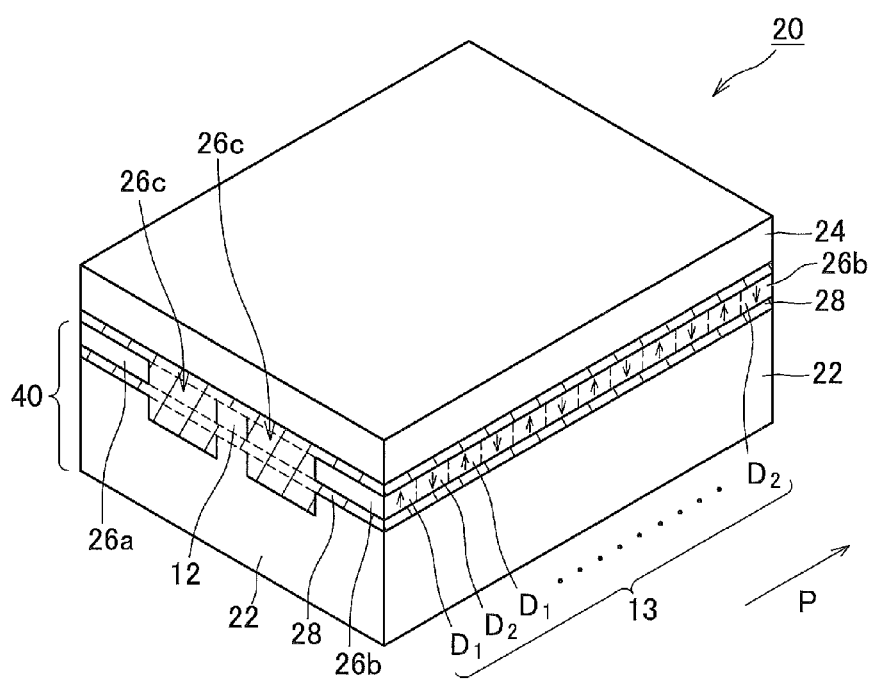

Next, a wavelength conversion element according to the embodiment of the present invention and a manufacturing method thereof will be explained with reference to FIG. 2 to FIG. 4. FIG. 2A is a perspective view schematically showing a structure of a wavelength conversion element. FIG. 2B is an end view along a line A-A shown in FIG. 2A. FIG. 3A and FIG. 3B are perspective views showing, in a process order, a manufacturing method of the wavelength conversion element. FIG. 4A and FIG. 4B are perspective views showing, in a process order, processes following the process shown in FIG. 3B.

Structure

As shown in FIG. 2A and FIG. 2B, a wavelength conversion element 20 includes the optical waveguide 18 including the core 12 that is formed as the polarization inversion structure and the cladding 16 that covers all the side surfaces of the core 12, excluding end surfaces into which and out of which the light is input and output. Further, the wavelength conversion element 20 includes a first base plate 22 and a second base plate 24 that sandwich the optical waveguide 18 from above and below in the thickness direction. In addition, the wavelength conversion element 20 is provided with a first substrate portion 26a and a second substrate portion 26b on both sides of the optical waveguide 18 in the width direction. The first substrate portion 26a and the second substrate portion 26b are partial regions of a ferroelectric crystal substrate 26 that is formed as a polarization inversion structure.

More specifically, along with the first and second substrate portions 26a and 26b, the core 12 forms part of the parallel plate-shaped ferroelectric crystal substrate 26 that is bonded to the first base plate 22 by an adhesive 28. However, partial regions 26c of the ferroelectric crystal substrate 26 on both sides of the core 12 in the width direction are removed along the light propagation direction, and the remaining substrate regions form the core 12 and the first and second substrate portions 26a and 26b. It should be noted that, in this example, a LiNbO$_3$ substrate that is formed as the polarization inversion structure by a well-known method is used for the ferroelectric crystal substrate 26.

Referring to FIG. 2B, the core 12 is a square shape in cross section, and in this example, it is a square shape in cross section in which a width W and a height H are 5 μm, respectively. It is preferable for the width W and the height H of the core 12 to be a minimum of 3 μm or more, and to be a maximum of 10 μm or less, and it is even more preferable for them to be a minimum of 3 μm or more and a maximum of 5 μm or less. By setting the dimensions of the core 12 to be in this range, a power density of the fundamental light IN propagating through the core 12 is increased and it is possible to improve the wavelength conversion efficiency.

Further, by making the cross section shape of the core 12 as the square shape, along with using a material having a uniform refractive index for the cladding 16, it is possible to make the optical waveguide 18 polarization independent. More specifically, by making the refractive index profile in the thickness direction and the refractive index profile in the width direction equally symmetrical, it is possible to cause the optical waveguide 18 to be polarization independent.

As a result, while reducing loss, the optical waveguide 18 can perform propagation of not only the TM polarized wave on which the wavelength conversion is performed, but also of the TE polarized wave, and thus it is possible to improve efficiency of the use of light. Thus, for example, another wavelength conversion element for TE polarized wave can be installed in tandem on the output end of the optical waveguide 18, the other wavelength conversion element having a core that is formed as the polarization inversion structure having a direction of spontaneous polarization that is orthogonal to that of the core 12. By doing this, it becomes possible to perform wavelength conversion of not only the TM polarized wave but also the TE polarized wave and the efficiency of the use of light can be further improved.

The cladding 16 is the adhesive 28 that is used to bond the first and second base plates 22 and 24 to the top and bottom of the ferroelectric crystal substrate 26. In other words, the adhesive 28, which is filled between mutually facing principal surfaces of the first and second base plates 22 and 24, is used as the cladding 16, and the core 12, which extends in parallel to the principal surfaces, is provided in the cladding 16. That is, in the wavelength conversion element 20, by making the adhesive 28 sufficiently thick, namely, by embedding the core 12 in the adhesive 28, the adhesive 28 is caused to function as the cladding 16.

In order to cause the adhesive 28 to function as the cladding 16, it is preferable for the thickness of the adhesive 28 to be 2 μm or more. Namely, it is preferable for all of the following thicknesses to be 2 μm or more: (1) the thickness of the adhesive 28 between the bottom surface of the core 12 and the first base plate 22, (2) the thickness of the adhesive 28 between the top surface of the core 12 and the second base plate 24, and (3) the thickness of the adhesive 28 between the two side surfaces of the core 12 and the first and second substrate portions 26a and 26b. By causing the thickness of the adhesive 28 to be 2 μm or more, the adhesive 28 functions sufficiently as the cladding 16 in practical terms, and radiation to the outside of light that is propagating through the optical waveguide 18 is suppressed.

Here, a known optical adhesive having a refractive index that is lower than that of the core 12 can be used as the adhesive 28. For example, an epoxy resin, a modified methacrylate resin, or a modified acrylate resin can be used.

The first base plate 22 is a parallel plate and functions as a base to which the ferroelectric crystal substrate 26 is bonded. In other words, before the substrate portions that are the partial regions 26c are removed, the ferroelectric crystal substrate 26 is bonded to the top surface of the first base plate 22 using the adhesive 28 having a thickness of 2 μm or more. Note that, in this example, a glass base plate is used as the first base plate 22.

Then, both the bonded base plate 22 and the substrate 26 are diced from the ferroelectric crystal substrate 26 side, and a recessed portions 22b are formed in the first base plate 22 while removing the partial regions 26c. In order to provide a sufficient thickness of the cladding 16 in the width direction, it is preferable for the width of each of the partial regions 26c provided on each side of the core 12 to be 2 μm or more. It should be noted that the recessed portions 22b and the partial regions 26c are filled with the adhesive 28 in the course of bonding the second base plate 24.

Note that, by providing the recessed portions 22b in the first base plate 22 and filling the recessed portions 22b with the adhesive 28, it is possible to also make the refractive index profile symmetrical in a direction that is diagonal with respect to a central axis of the core 12, and thus the symmetry of the refractive index of the periphery of the core 12 can be further improved.

The second base plate 24 is a parallel plate that is bonded, via the adhesive 28, to the top surfaces of the core 12, and the first and second substrate portions 26a and 26b. Note that, in this example, a glass base plate is used as the second base plate 24.

When bonding the second base plate 24, the adhesive 28 is filled, without any gaps, into the recessed portions 22b and the partial regions 26c that have been formed by dicing as described above. In order to cause the adhesive 28 that is used when bonding the second base plate 24 to function as the cladding 16, in the width direction, it is preferable for the thickness of the adhesive 28, as measured from both end surfaces of the core 12, to be 2 μm or more. Further, in the thickness direction, it is preferable to interpose the adhesive 28 having a thickness of 2 μm or more between the top surface of the core 12 and the bottom surface of the second base plate 24. Note that the adhesive 28 that is used when bonding the second base plate 24 may be the same material as the adhesive used when bonding the first base plate 22, or may be a different material, as long as the refractive index is equal.

By providing the cladding 16 with the thickness of 2 μm or more in this manner on all the side surfaces of the core 12 along the light propagation direction, the symmetry of the refractive index profile of the optical waveguide 18 is improved. As a result, the overlap of the electric field distributions of the fundamental light IN and the wavelength converted light OUT becomes larger, and the wavelength conversion efficiency is improved.

In addition, by forming the core 12 as the square shape in a transverse cross section, and further, by making equal the refractive index profile with respect to both the width and height directions, the optical waveguide 18 can be caused to be polarization independent. In this way, the efficiency of the use of light is improved.

It should be noted that the ferroelectric crystal substrate 26 is not limited to the $LiNbO_3$ substrate, and a well-known ferroelectric crystal substrate can be used, such as a $LiTaO_3$ substrate, a $KTiOPO_4$ substrate, or a $KNbO_3$ substrate. Furthermore, in order to adjust the refractive index, these substrates may be formed by selecting and doping one or more types of elements from among Mg, Zn, Sc and In etc.

It should also be noted that alternatively to the glass substrate, Si, quartz or one of the above-described various ferroelectric crystal substrates can be used as the first and second base plates 22 and 24. As described above, as long as the cladding 16 having the sufficient thickness can be provided between the core 12 and the first and second base plates 22 and 24, the material forming the first and second base plates 22 and 24 is not particularly limited. The refractive index of the material maybe higher or lower than that of the core 12. Further, as long as the adhesive 28 having the thickness of 2 μm or more can be provided on the top surface of the core 12, the second base plate 24 is not particularly necessary.

Manufacturing Method

Next, a manufacturing method of the wavelength conversion element according to the embodiment of the present invention will be explained with reference to FIG. 3 and FIG. 4. FIG. 3A and FIG. 3B are perspective views showing, in an order of processes, a manufacturing method of the wavelength conversion element. FIG. 4A and FIG. 4B are perspective views showing, in an order of processes, processes following the process shown in FIG. 3B.

First Process: FIG. 3A

As shown in FIG. 3A, a parallel plate shaped ferroelectric crystal substrate 26' that is formed as a polarization inversion structure is prepared. Then, the first base plate 22 and the ferroelectric crystal substrate 26' are bonded together by the adhesive 28 having the thickness of 2 μm or more that is filled between a principal surface of the ferroelectric crystal substrate 26' and a principal surface of the first base plate 22.

Second Process: FIG. 3B

Next, as shown in FIG. 3B, the ferroelectric crystal substrate 26' that is bonded to the first base plate 22 is polished in accordance with a known method until the core 12 reaches a thickness H. In this way, the parallel plate shaped ferroelectric crystal substrate 26 having the thickness H is disposed on the first base plate 22 via the adhesive 28.

Third Process: FIG. 4A

Next, as shown in FIG. 4A, a dicing saw 30 etc. is used to form, from the side of the ferroelectric crystal substrate 26, two grooves 32a and 32b that extend in a parallel manner in a direction that is perpendicular to the boundary surfaces S of the first and second domains $D_1$ and $D_2$. By cutting the grooves 32a and 32b, the region of the ferroelectric crystal substrate 26 that remains between the two grooves 32a and 32b becomes the core 12. Hereinafter, a structural body in which the grooves 32a and 32b and the core 12 are formed in this manner is referred to as an element precursor 40.

Here, the depth of the grooves 32a and 32b as measured in the thickness direction is assumed to be equal to or greater than the thickness of the ferroelectric crystal substrate 26. In this example, the ferroelectric crystal substrate 26 is diced using the dicing saw 30, and the recessed portions 22b are formed in the first base plate 22 while removing the partial regions 26c.

Further, the width of each of the grooves 32a and 32b, namely a distance between the side surface of the core 12 and each of the first and second substrate portions 26a and 26b, is 2 μm or more.

Fourth Process: FIG. 4B

Next, as shown in FIG. 4B, the element precursor 40 and the second base plate 24 are bonded together by filling the adhesive 28 between the surface of the element precursor 40 on which the core 12 is formed and the principal surface of the second base plate 24. At the same time that the inside of the two grooves 32a and 32b is filled with the adhesive 28, the adhesive 28 having the thickness of 2 μm or more is interposed between the top surface of the core 12 and the principal surface of the second base plate 24 and the adhesive 28 is caused to function as the cladding 16.

In this manner, the wavelength conversion element 20 is obtained that has the core 12 embedded in the cladding 16 (the adhesive 28) that has a uniform refractive index.

It should be noted that in this example, in the fourth process, the case is explained in which the second base plate 24 is bonded to the element precursor 40. However, as long as it is possible to provide the adhesive 28 having the sufficient thickness on the top surface of the core 12 and inside the grooves 32a and 32b, the second base plate 24 need not necessarily be provided.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A manufacturing method of a wavelength conversion element, the manufacturing method comprising:
    bonding a ferroelectric crystal substrate having a periodically poled structure in which first and second domains having mutually inverted directions of spontaneous polarization are alternately aligned side by side to a first base plate, using an adhesive having a thickness of 2 μm or more that is filled between mutually facing principal surfaces of the ferroelectric crystal substrate and the first base plate;
    forming, from a side of the ferroelectric crystal substrate, two grooves extending along a direction that is non-parallel to boundary surfaces of the first and second domains such that a depth of the grooves is equal to or greater than a thickness of the ferroelectric crystal substrate as measured perpendicularly from the principal surface of the ferroelectric crystal substrate, and a width of the grooves is equal to or more than 2 μm as measured orthogonally to a light propagation direction of the grooves and in parallel to the principal surface of the ferroelectric crystal substrate, thereby forming an element precursor in which a region of the ferroelectric crystal substrate between the two grooves is a core; and
    bonding the element precursor to a second base plate by filling the adhesive between a surface of the element precursor on which the core is formed and a principal surface of the second base plate, so as to interpose the adhesive having a thickness of 2 μm or core between a top surface of the core and the principal surface of the second base plate while also filling an inside of the two grooves with the adhesive,
    wherein the adhesive is caused to function as a cladding.

* * * * *